United States Patent
Pokharel

(10) Patent No.: US 10,469,423 B2
(45) Date of Patent: *Nov. 5, 2019

(54) CLOUD HOSTED MULTIMEDIA FILE HANDLING ON MOBILE DEVICES

(71) Applicant: SALESFORCE.COM, INC., San Francisco, CA (US)

(72) Inventor: Anurodh Pokharel, Brookline, MA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,513

(22) Filed: Jun. 15, 2018

(65) Prior Publication Data

US 2018/0295082 A1 Oct. 11, 2018

Related U.S. Application Data

(63) Continuation of application No. 14/620,442, filed on Feb. 12, 2015, now Pat. No. 10,064,024.

(60) Provisional application No. 61/939,764, filed on Feb. 14, 2014.

(51) Int. Cl.
| | | |
|---|---|---|
| *H04W 4/12* | (2009.01) | |
| *G06F 3/00* | (2006.01) | |
| *H04L 12/58* | (2006.01) | |
| *H04L 29/08* | (2006.01) | |
| *G06F 16/10* | (2019.01) | |
| *H04W 4/14* | (2009.01) | |
| *H04M 1/725* | (2006.01) | |

(52) U.S. Cl.
CPC ............ *H04L 51/10* (2013.01); *G06F 3/00* (2013.01); *G06F 16/10* (2019.01); *H04L 51/18* (2013.01); *H04L 67/02* (2013.01); *H04L 67/06* (2013.01); *H04M 1/72547* (2013.01); *H04M 2250/64* (2013.01); *H04W 4/14* (2013.01)

(58) Field of Classification Search
CPC ........................ H04W 4/14; H04M 1/72547
See application file for complete search history.

(56) References Cited

U.S. PATENT DOCUMENTS

| | | |
|---|---|---|
| 6,449,483 B1 | 9/2002 | Akhteruzzaman et al. |
| 6,591,103 B1 | 7/2003 | Dunn et al. |
| 6,757,365 B1 | 6/2004 | Bogard |

(Continued)

FOREIGN PATENT DOCUMENTS

| | | |
|---|---|---|
| GB | 2397730 B | 6/2006 |
| GB | 2431820 A | 5/2007 |
| WO | 2007015075 | 2/2007 |

OTHER PUBLICATIONS

European Search Report for corresponding European application No. 09805443.0, dated Dec. 11, 2013, total pages 8.

(Continued)

*Primary Examiner* — Lester G Kincaid
*Assistant Examiner* — Daniel G. Bassett
(74) *Attorney, Agent, or Firm* — Morris & Kamlay LLP

(57) ABSTRACT

A method for handling a cloud hosted multimedia file on mobile devices includes receiving a message with a link to multimedia file, extracting the link and determining an address of multimedia server, contacting the multimedia server to determine a file type and determining whether the file type is supported.

14 Claims, 5 Drawing Sheets

(56) References Cited

U.S. PATENT DOCUMENTS

| | | |
|---|---|---|
| 7,010,312 B1 | 3/2006 | Zechlin |
| 7,197,035 B2 | 3/2007 | Asano |
| 7,263,076 B1 | 8/2007 | Leibovitz et al. |
| 7,275,104 B1 | 9/2007 | Martinez et al. |
| 7,343,168 B2 | 3/2008 | Valloppillil |
| 7,380,022 B2 | 5/2008 | Tell et al. |
| 7,446,655 B2 | 11/2008 | Jha et al. |
| 7,499,704 B1 | 3/2009 | Bonner |
| 7,564,958 B1 | 7/2009 | Contractor |
| 7,606,568 B2 | 10/2009 | Gallagher et al. |
| 7,693,535 B2 | 4/2010 | Dunko |
| 7,716,297 B1 | 5/2010 | Wittel et al. |
| 7,734,908 B1 | 6/2010 | Kung et al. |
| 7,860,525 B2 | 12/2010 | Parkkinen et al. |
| 7,865,198 B2 | 1/2011 | Shin |
| 8,463,304 B2 | 6/2013 | Lauer et al. |
| 8,578,261 B1 * | 11/2013 | Gupta ............... G06F 17/30899 715/205 |
| 8,738,721 B1 | 5/2014 | Smirnov et al. |
| 8,780,823 B1 | 7/2014 | Sebastian |
| 8,989,713 B2 | 3/2015 | Daulton |
| 9,286,378 B1 * | 3/2016 | Zarakhovsky .... G06F 17/30705 |
| 2003/0225797 A1 | 12/2003 | Shields et al. |
| 2004/0076144 A1 | 4/2004 | Ishodoshiro |
| 2004/0109452 A1 | 6/2004 | Takihiro et al. |
| 2005/0148353 A1 | 7/2005 | Hicks et al. |
| 2005/0233733 A1 | 10/2005 | Roundtree et al. |
| 2005/0277407 A1 | 12/2005 | Ahn et al. |
| 2005/0288045 A1 | 12/2005 | Yang et al. |
| 2006/0040606 A1 | 2/2006 | Kangas |
| 2006/0075052 A1 * | 4/2006 | Oostendorp ............ H04L 51/12 709/206 |
| 2006/0142012 A1 | 6/2006 | Kirchhoff et al. |
| 2006/0148495 A1 | 7/2006 | Wilson |
| 2007/0066318 A1 | 3/2007 | Danzeisen et al. |
| 2007/0073585 A1 | 3/2007 | Apple et al. |
| 2007/0190978 A1 | 8/2007 | ilVhite et al. |
| 2008/0043969 A1 | 2/2008 | Shi |
| 2008/0114862 A1 | 5/2008 | Moghaddam |
| 2008/0140850 A1 | 6/2008 | Gade et al. |
| 2008/0172496 A1 | 7/2008 | Middleton et al. |
| 2008/0182563 A1 | 7/2008 | Wugofski et al. |
| 2008/0263137 A1 | 10/2008 | Pattison et al. |
| 2008/0293404 A1 | 11/2008 | Scherzer et al. |
| 2009/0005005 A1 | 1/2009 | Forstall et al. |
| 2009/0031232 A1 | 1/2009 | Brezina et al. |
| 2009/0063280 A1 | 3/2009 | Wurster |
| 2009/0088188 A1 | 4/2009 | Wormald et al. |
| 2009/0144395 A1 | 6/2009 | DeSalvo |
| 2009/0154434 A1 | 6/2009 | Tanaka et al. |
| 2009/0156202 A1 | 6/2009 | Reiss et al. |
| 2009/0164564 A1 * | 6/2009 | Willis ............... G06F 17/30017 709/203 |
| 2009/0186634 A1 | 7/2009 | Sureka |
| 2010/0029273 A1 | 2/2010 | Bennett |
| 2010/0161722 A1 * | 6/2010 | Jeon .................... G06Q 10/107 709/203 |
| 2011/0070868 A1 | 3/2011 | Scholz et al. |
| 2013/0078990 A1 * | 3/2013 | Kim .................... G06F 17/3005 455/422.1 |
| 2013/0219262 A1 * | 8/2013 | Becker ............. G06F 17/30861 715/234 |
| 2014/0143435 A1 | 5/2014 | Jung et al. |
| 2015/0082198 A1 | 3/2015 | Destagnol et al. |
| 2015/0143224 A1 * | 5/2015 | Kennedy ............. G06F 17/2247 715/234 |

OTHER PUBLICATIONS

International Search Report and Written Opinion dated Dec. 7, 2011 in corresponding International Application No. PCT/US2011/037190.

* cited by examiner

CLOUD HOSTED MULTIMEDIA FILE HANDLING ON MOBILE DEVICES

FIELD OF THE INVENTION

The present invention relates to messaging and communications, and to mobile telephony and multimedia file handling.

BACKGROUND

People around the world are confronted by a number of communications and writing devices which have evolved relatively recently from the separate areas of telephone communications networks, wireless networks, television or cable networks, and computer networks and personal computers. The more recent devices, mobile phones with message/picture/video texting, personal digital devices for Internet browsing and computer-based blogging and social networking sites, have been shaped in part by the separate networks of origin, but the nature and capabilities of many of these now-ubiquitous devices have both converged and also advanced quickly in different directions as the industries controlling each sector have capitalized on their market power, reservoir of legacy subscribers and, in some cases, regulatory barriers and proprietary network equipment and connection protocols, to introduce new consumer features, often employing developments from other consumer products, and aiming to lure subscribers by mimicking those products. However, in doing so, each industry has also been limited by its own equipment, data transfer speeds and connection abilities.

Thus, as digital imaging advanced and consumers learned to take and handle images and to attach the images to e-mail messages, imaging chipsets were incorporated into mobile telephones and the mobile phones were configured to display images and allow their transmission between phones. Text and message protocols allowed transmission of 'instant' messages, and coded standardized greetings and messages between phone users, filling a niche for immediate portable, personal communication that was not met by existing personal computer devices. Devices like the iPhone®, introduced in 2007 allowed a user to access his Internet-based email from his mobile phone via a specially-configured data connection with his mobile service provider, and to exchange content via wireless connection to his personal computer.

However, despite these developments blurring boundaries between the classical phone, mobile telephone, Internet, wireless and television or cable networks, there has not been a convergence. Rather, although industry and government groups have promoted interface standards for several different classes of data or communication, each industry has retained much of its special structure, and the devices served by an industry (such as mobile telephones) may find their feature set constrained by intrinsic limitations of bandwidth and connectivity, by available networking equipment base, and by the level of contractual cooperation agreements of its provider. The many different classes of communications systems now available, and the many separate provider networks in each class, have also required the development of new supporting entities, such as nationally or internationally extending registries, aggregators, exchanges and other entities, in order to affect timely transfer of data, messages and/or entertainment content. This second-level infrastructure imposes further constraints of the feasible, or economically feasible, set of features that a consumer may exercise.

Thus, for example, mobile telephones have been augmented with a display and the ability to run small applications such as games, MP3 players, Internet browsers/applications and email retrieval, while personal computers have the capability to run larger programs, employ wireless connectivity and perform voice-over-IP (VOIP) Internet communications. Various special-purpose applications requiring cross-platform connections may be provided, or applications simulating cross-platform capabilities may be developed, by a service provider, such as a television-displayed chat session available for subscribers of a TV provider. However, many other personal devices while having large data capacity, ability to connect to another user device and ability to run entertainment apps, may entirely lack the mobile telephone electronic circuitry necessary for exchanging mobile messages with telephone users. Additionally, the delivery of messages in some social messaging systems is affected by limitations of carrier networks and international boundaries. It is therefore desirable to provide a system for enhanced communication between personal devices.

Conventional systems implemented by mobile carriers (e.g., Nextel/Sprint, AT&T, Verizon and T-mobile), have constrained bandwidth and spectrum issues when processing multimedia files delivered to mobile devices The bandwidth constraints are exacerbated by the unnecessary downloads of multimedia file types.

SUMMARY OF THE INVENTION

Embodiments disclosed herein, avoid unnecessary downloads of multimedia file types (video, audio, images) over constrained mobile networks if display or rendering of the multimedia file is not going to work on the particular mobile device.

In one embodiment, a technique for handling a cloud hosted multimedia file on mobile devices includes receiving a message with a link to multimedia file, extracting the link and determining an address of multimedia server, contacting the multimedia server to determine a file type and determining whether the file type is supported. Such techniques conserve network bandwidth and allows for independence from the device being the central point of data flow management. In this embodiment, an HTTP head command can be uses to determine a file type when contacting the multimedia server.

In another embodiment, the technique further includes displaying the link in response to determining that the file type is not supported. In still another embodiment, the technique further includes determining whether the multimedia file is oversized. In yet another embodiment, the technique further includes downloading the multimedia file as a thumbnail in response to determining that the file type is supported. In still another embodiment, the technique further includes displaying playback controls for an audio multimedia file in response to determining that the file type is supported. In another embodiment, the technique further includes receiving a user request via a tap on icon and displaying the multimedia file. In another embodiment, the method further includes determining that the message is spam by detecting that a file size of the multimedia file as reported in a response to the HEAD command is not within a predetermined range for the file type as reported in the response to the HEAD command. In a still further embodiment, the method includes determining that the message is spam by detecting that an ETag of the multimedia file as reported in a response to the HEAD command is being used in an attempt to repeatedly send the multimedia file with different URLs.

A computer readable storage medium for tangibly storing thereon computer readable instructions includes instructions for receiving a message with a link to multimedia file, extracting the link and determining an address of multimedia server, contacting the multimedia server to determine a file type and determining whether the file type is supported.

Embodiments of the invention include any type of computerized device, workstation, handheld, tablet or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the social messaging hub, client applications including avoiding unnecessary downloads of multimedia file types can be embodied strictly as a software program, as software and hardware, or as hardware alone such as within a single processor or multiple processors, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

A social messaging hub combines connectivity to the global SMS infrastructure and IP connectivity to data enabled devices to provide access to multimedia files while conserving bandwidth by downloading only files which are displayable and satisfy other requirements, for example, a predetermined maximum size.

Figure 1:
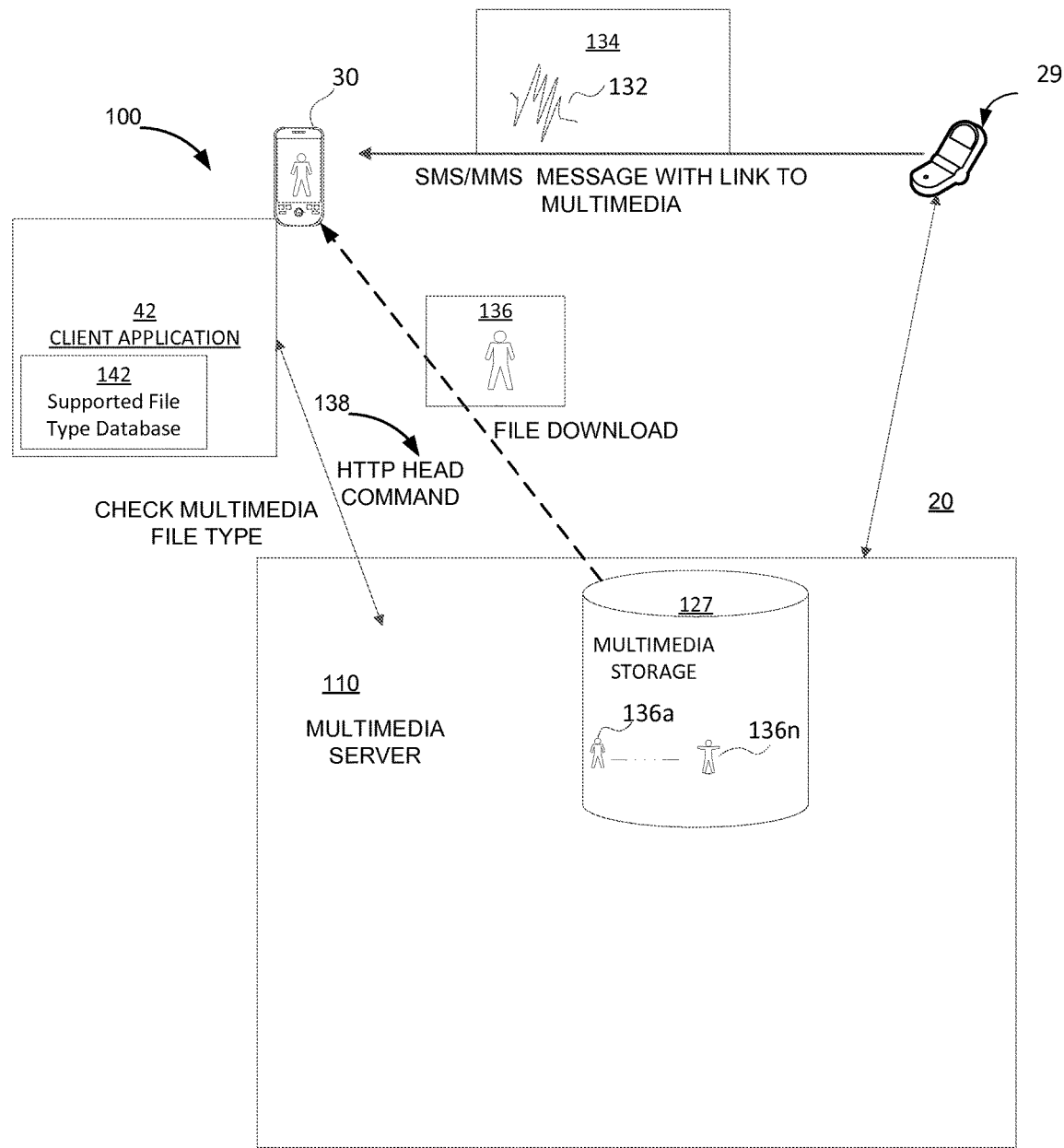
FIG. 1 is a block diagram of a system for file handling in conjunction with SMS messaging according to embodiments herein.

Referring now to FIG. 1, a block diagram illustrates a general architecture of a system as part of an exemplary social messaging hub 100 (also referred to as system 100) and related processes for handling a cloud hosted multimedia file on mobile devices. The system 100 interacts with one or more data enabled device or mobile phone (here shown as data enabled device 30 (also referred to as mobile device 30 and mobile phone 30) and mobile phone 29. The data enabled device 30 includes a client application 42 which further includes a supported file type database 142. The system 100 operates in a messaging infrastructure which includes a multimedia server 110. The data enabled device 30 can communicate with the multimedia server 110 which includes a multimedia storage subsystem 127 which includes a plurality of multimedia files 136a -136n (generally referred to as multimedia file 136). The multimedia server 110 has an ability to process HTTP Head commands.

In operation, a person/sender operating the mobile phone 29 sends an SMS/MMS/EMS message 134 (also referred to as a text message 134 or SMS message 134) including a link 132 to a multimedia file 136 to person/recipient operating the data enabled device 30. The SMS message 134 with link 132 can be sent from the mobile phone or an application running on a data enabled device through a mobile carrier or a social messaging hub. The client application 42 processes the text message 134 and identifies the link 132. The client application 42 then uses a HTTP HEAD command 138 to determine what kind of file is hosted at the link 132 on the multimedia server 110. The client application 42 checks the supported file type database 142, and if the file is an image or audio file that the data enabled device 30 supports, the multimedia file 136 is automatically downloaded and displayed as a thumbnail or a playable audio file. In one embodiment, the user can tap on the thumbnail image to view full size image without leaving the client application 42 or the user can tap play to play the audio as if the content were sent to the client application like an attachment.

Figure 2:
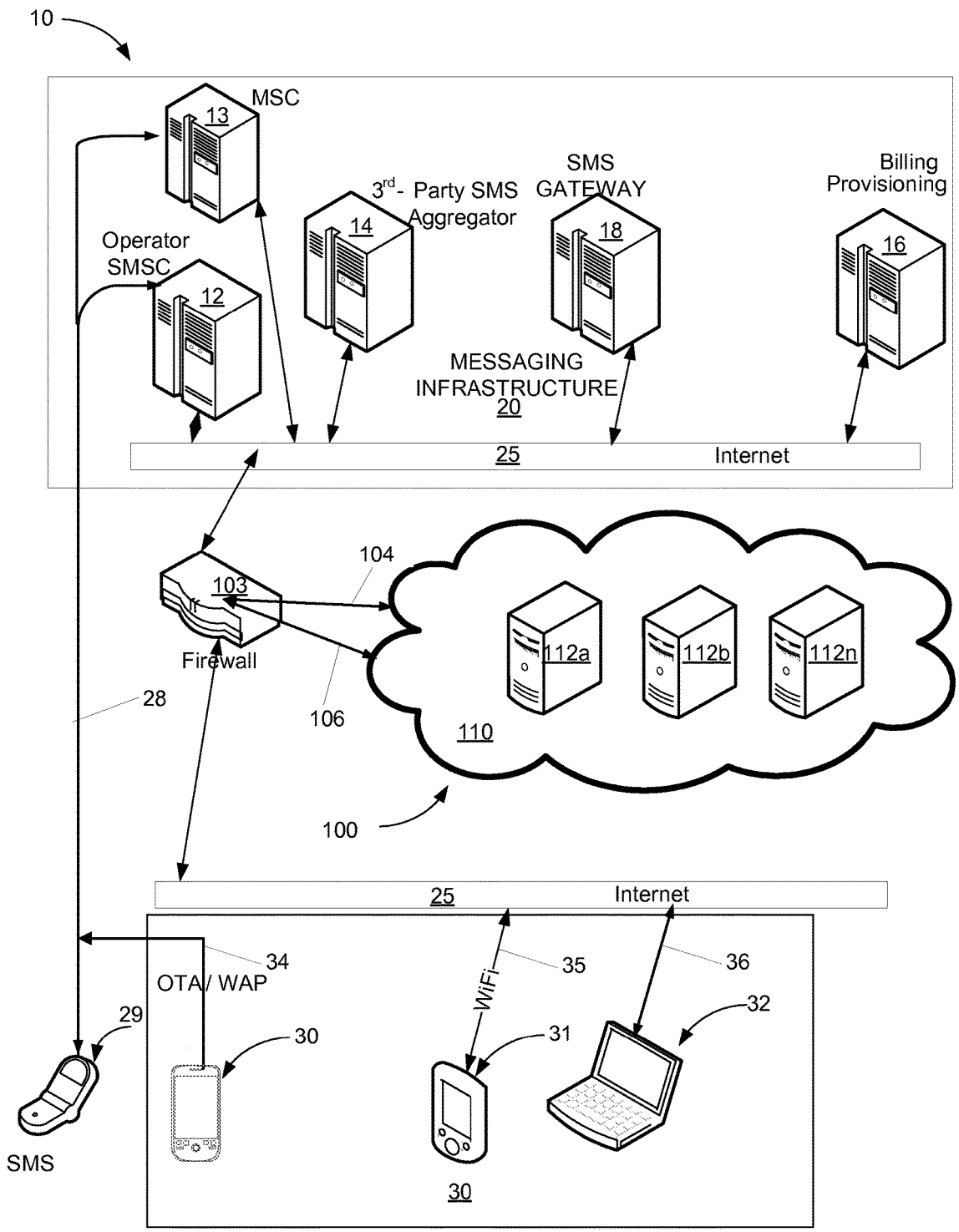
FIG. 2 is a schematic illustration of a social messaging hub and network environment/messaging infrastructure in accordance with one example embodiment disclosed herein.

Now referring to FIG. 2, the exemplary social messaging hub 100 operates in network environment 10 which includes the messaging infrastructure 20. The social messaging hub 100 includes one or more processors 112a-112n and is coupled to the network environment 10 and messaging infrastructure 20 through a firewall 103. The firewall 103 is typically located at a social messaging hub 100 hosting facility.

The messaging infrastructure 20 includes, but is not limited to, a Short Message Service Center (SMSC) 12, a third party SMS aggregator 14 (also referred to a SMS aggregator 14), a billing and provisioning system 16, an SMS Gateway (SMS-GW) 18, social messaging gateways 22 and a cellular phone infrastructure 28. Other components of the messaging infrastructure 20 include a Mobile Switching Centre (MSC) 13 and additional SMS-Gateways and other SMSCs and billing and provisioning systems provided by additional mobile carrier service providers (not shown). The SMSC 12 and the billing and provisioning system 16 are typically operated by a mobile carrier service provider. The MSC 13 is also typically operated by a mobile carrier service provider. The social messaging gateways 22 include connections to IM services, for example AOL instant messenger (AIM), Yahoo Messenger, Windows Live Messenger Jabber, Skype, Tencent QQ, ICQ and GoogleTalk (gTalk), and other social networks such as Facebook and Twitter.

In one embodiment, the social messaging hub 100 communicates with the systems in the messaging infrastructure 20 (e.g., SMSC 12, the third party SMS aggregator 14 and the billing and provisioning system 16) using various network protocols including the Short Message Peer-to-Peer (SMPP) protocol, Signaling Transport (SIGTRAN) protocol or SS7 protocol. The SMPP protocol is a telecommunications industry protocol for exchanging SMS messages between SMS peer entities.

In this embodiment, the link between the social messaging hub 100 and the messaging infrastructure 20 is secured by the firewall 103 using, for example, a virtual private network (VPN) connection with HTTPS using 1024 bit (3DES-SHA1) encryption. Messages are transferred over SMPP link 104 and provisioning and single sign on (SSO), XML and SOAP messages and other control traffic are interchanged over control link 106. In another embodiment, messages are transferred over SIGTRAN (SS7 over IP) depending on the connection (e.g., a connection to a European Mobile Operator).

The social messaging hub 100 is connected via the Internet 25 or a dedicated connection to the messaging infrastructure 20 that relays messages between existing customer equipment, for example, a mobile phone 29, a data enabled mobile phone 30, a data enabled WiFi phone 31 and other data enabled devices (not shown) such as a laptop, netbook, tablet and a smart phone. The mobile phone 29 can be connected to the social messaging hub 100 over the cellular phone infrastructure 28 through the SMSC 12 using an SMS protocol. The MSC 13 is also connected to the cellular phone infrastructure 28. The data enabled mobile phone 30 can be connected to the social messaging hub 100 over the cellular phone infrastructure 28 using a data connection provided by OTA/WAP protocols. A data enabled WiFi phone 31 can be connected to the social messaging hub 100 via a WiFi connection to the Internet. It is understood that a mobile phone can be data enabled via both a WAP connection and a WiFi connection. The data enabled WiFi phone 31 is sometimes referred to as a dual mode phone if it can also connect over WAP. As referred to herein, a "non-telephony" device is a data enabled device which does not incorporate mobile phone hardware and software and which sends and receives SMS messages over an IP channel in contrast to mobile phone 29 which sends and receives SMS messages over standard cellular phone control channel.

A laptop personal computer 32 can be connected to the social messaging hub 100 via a wired Internet 25 connection 36 or a wireless Internet connection (not shown). Other mobile/portable data enabled devices (not shown) include but are not limited to a portable media players, personal digital assistants, Wi-Fi mobile platforms, pad-tablet computers, portable e-Readers, personal computers, portable game players, game consoles and netbook computers which can be connected to the social messaging hub 100 via the Internet 25 using a WiFi, wired or other wireless connection. These devices, the data enabled mobile device 30 and the data enabled WiFi phone 31 are collectively referred to as a data enabled device 30 or devices 30 and these devices generally establish an Internet protocol (IP) session or connection with the social messaging hub 100. Some data enabled devices 30 interface with the social messaging hub 100 using a client browser 37 and other data enabled devices 30 interface with the social messaging hub 100 using a client software component (also referred to as a client application or simply "app"). The client browser 37 communication to a corresponding web application and the client application (app) are collectively referred to as application 40. In one embodiment the application 40 (also referred to as a social messaging application or App) is a HeyWire App an application supplied by MediaFriends Inc. and referred to as HeyWire App 40 or simply HeyWire. Client application 42 can run separately or can be included in HeyWire App 40.

In operation and as described below in more detail, the social messaging hub 100 obtains a plurality of unique identifiers which in one embodiment, are telephone numbers acquired through or serviced by a competitive local exchange carrier (CLEC), local exchange carrier (LEC) or other provider that is authorized to issue or service registered phone numbers, and the set of numbers so issued may be serviced by that carrier's network, another carrier network or by a separate entity or sub-entity such as a network unaffiliated virtual operator (NUVO), that serves as the service provider to users and functions as a destination carrier to receive messages directed to its telephone numbers from the SMS aggregator 14, an SMS operator (e.g., a mobile carrier), a content provider or another NUVO, and to provide an Internet interface for delivery of the messages to users' data enabled devices 30.

The social messaging hub 100 assigns a user of a data enabled device 30 a unique identifier from the plurality of unique identifiers and the social messaging hub 100 associates the unique identifier with a data enabled device identifier. The data enabled device identifier includes but is not limited to a network address, a Unique Device Identifier (UDID), a Media Access Control address (MAC address), a International Mobile Equipment Identity (IMEI), a Mobile Equipment Identifier (MEID), a Electronic Serial Number (ESN) and a CPU serial number, of the data enabled device 30. The social messaging hub 100 registers the association between the unique identifier with a data enabled device identifier in a database. After the user is assigned a unique identifier, a userid and password is when the application 40 is started.

When the user registers the enabled device 30 and signs-in to an IM service or social media account (e.g., AIM, Yahoo Messenger, Windows Live Messenger and Google-Talk, Facebook, Twitter, etc.) the account information is stored, in certain embodiments, on the user's data enabled device in a mini database for app. Previously stored login/signon information can be retrieved in order to sign on the user automatically.

In one embodiment, the user is given a registered phone number and unique IP addressable identification. The IP addressable identification is a connectionless method by which the user supplied email address, supplied as part of the registration process for contact purposes, is combined with the unique registered phone number. By affecting such a combination of two unique identifiers, each supplied by separate parties, a unique identification is created that can be located in a connectionless manner on the Internet.

For inbound messages (i.e., sent to the data enabled device 30), the social messaging hub 100 receives the text message from the messaging infrastructure 20 (e.g., message service SMSC 12, or SMS aggregator 14). The message is directed to the user's data enabled device 30 having the registered unique identifier obtained from the text message source, and the social messaging hub 100 provides the message to an inbound service, establishes a connection between a data enabled device 30 and the inbound service and pushes the text message from the inbound service to an application or web browser running on the data enabled device 30.

For outbound messages (i.e., sent from the data enabled device 30). the social messaging hub 100 receives the text message from the data enabled device 30 including a destination identifier for the message, processing the message and provide the message to SMS destination through the messaging infrastructure 20 (e.g., SMSC 12, or SMS aggregator 14) for delivery to the message recipient.

The social messaging hub 100 can submit multiple messages in one transmission using a 1 to many feature in conjunction with the application 40 (i.e., web client or smart phone app). The social messaging hub 100 transfers messages between data enabled devices 30 without the use of the message infrastructure 20 even if phone numbers are used as the addresses. Provisioning and SSO are incorporated in the social messaging hub 100 such that once a registered phone number and other user information is stored in database 126 connections and logins can be established automatically.

Further, the social messaging hub 100 may provide applications for managing the address books, messages and account information of the user. When the social messaging hub 100 is a separate message service center entity, the social messaging hub 100 operations may be incorporated by one or more mobile providers to extend their subscriber service capabilities and the provider entity may provide dedicated connections for affecting coordination between services, call logs and billing for the affected accounts.

Features of the social messaging hub 100 may be provided within, or as external hosting services communicating with an existing mobile network provider as a web based application using advanced web capabilities, and may be configured to handle all forms of messaging for the subscribers. Subscription/Unsubscription operations can be performed from a web client running on any data enabled device 30 that supports standard Internet browsers or from IP based applications.

Figure 3:
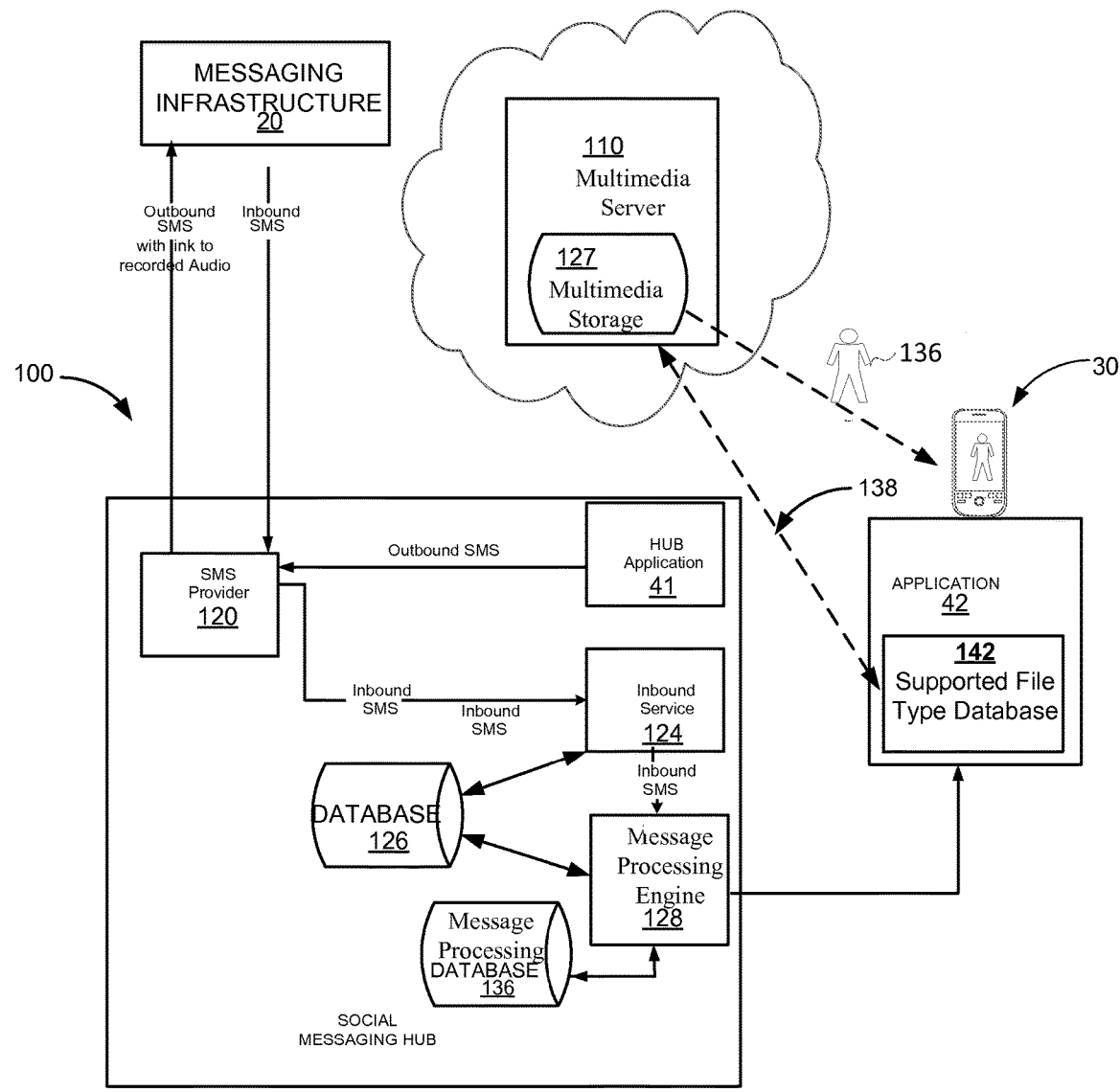
FIG. 3 is a schematic illustration of the social messaging hub of FIG. 1 including an embodiment of a system configured for multimedia file handling.

FIG. 3 illustrates the architecture of one embodiment of the social messaging hub 100 for multiple messaging applications. The social messaging hub 100 includes an SMS provider 120 which provides the interface to the messaging infrastructure 20 and in particular in one embodiment to the SMSC 12, SMS aggregator 14 and (SMS-GW) 18. The SMS provider 120 is used to send and receive SMS/MMS/EMS messages respectively to and from: a mobile phone 29 through the cellular phone infrastructure 28 and a data enable device 30 shown here as laptop personal computer 32 and a smart phone 50. The cloud environment includes at least one multimedia server 110 which includes multimedia storage subsystem 127. It is understood that the social messaging hub 100 may also include one or more multimedia servers 110.

In one embodiment, the SMS provider 120 is interfaced to a web farm 150 having one or more servers 152a-152n (collectively referred to as web server 152). The servers 152a-152n store the SMS/MMS/EMS messages received and SMS/MMS/EMS messages to be delivered in conjunction with database server 125 and database 126. The servers 152a-152n also support a Hub client application 42 which runs in conjunction an application 40 on data enabled device 30, here laptop 32 or smart phone 50. The web farm 150 is coupled to a database server 125 and corresponding database 126 which is used to store user information including the association between the assigned unique identifiers and data enabled device identifiers. The social messaging hub 100 further includes a common message conversation queue which is interfaced to the database 126 and the message processing engine 128.

Figure 4:
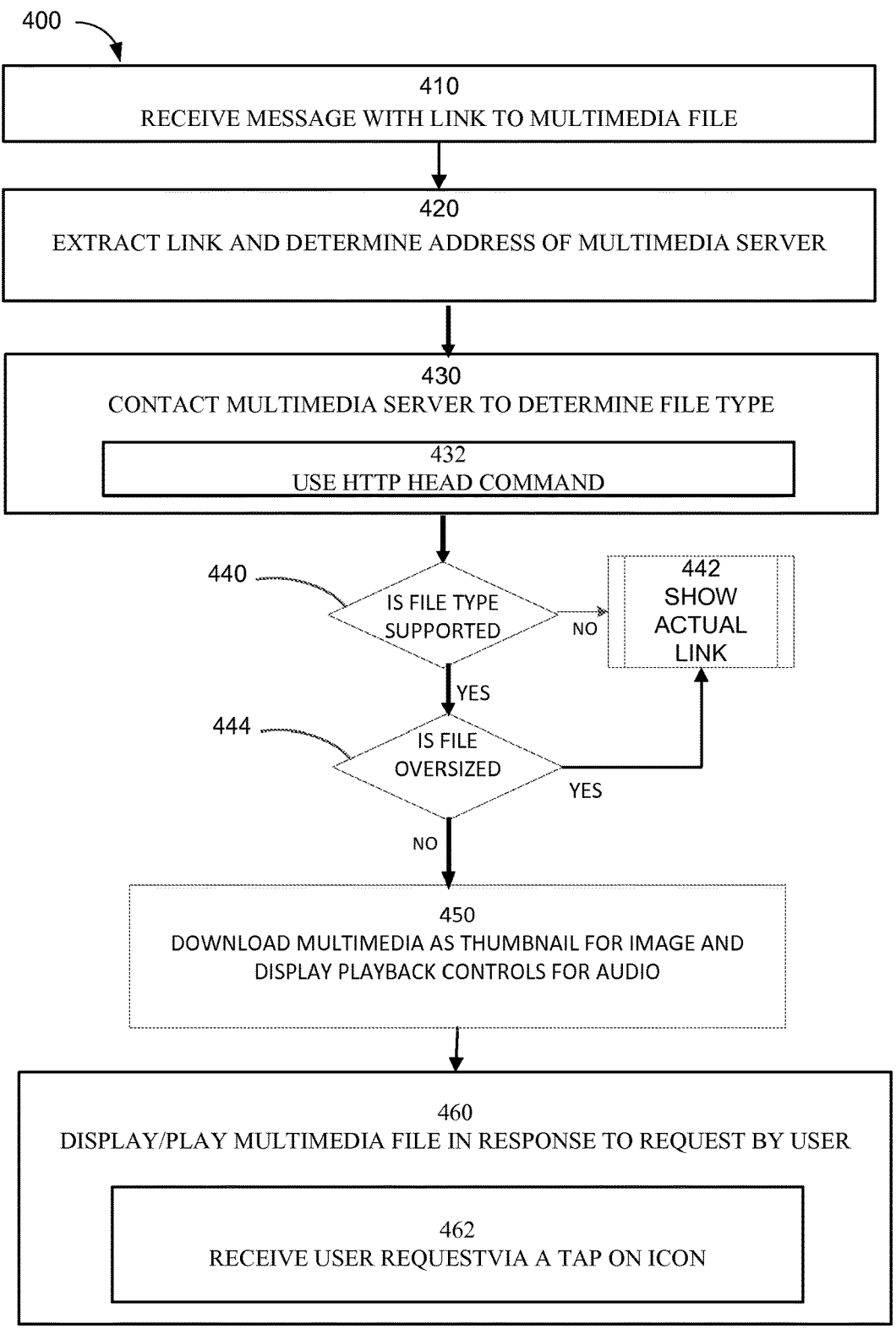
FIG. 4 is a flow chart of processing steps performed to handle multimedia files linked to text messages sent from mobile phones through a messaging infrastructure in accordance with embodiments disclosed herein.

In FIG. 4, flowchart 400 diagrams the overall process of the multimedia file handling process. In step 410, a message with a link to a multimedia file received. In step 420, the link is extracted and an address of the multimedia server is determined. In step 430, the multimedia server is contacted to determine file type. In one embodiment, in step 432 an HTTP HEAD command 138 is used for retrieving meta-information written in response headers, without having to transport the entire content. The HTTP/1.0 specification defines the GET, POST and HEAD methods. Details of the HEAD command can be found in RFC 2616—Hypertext Transfer Protocol which is incorporated by reference in its entirety.

An example HEAD command
Request:
HEAD/test/image.png HTTP/1.1
Host: www.heywire.com
Accept-Language: en-us
Connection: Keep-Alive
and the corresponding response is:
Response for an image file is:
HTTP/1.1•200•OK
Content-Length:•374404
Content-Type:•image/png
Last-Modified:•Thu, •05. Feb.•2015•17:32:12•GMT
Accept-Ranges:•bytes
ETag:•"4268f1ac6941d01:0"
Server:•Microsoft-IIS/7.5
X-Powered-By:•ASP.NET
Date: •Thu, •05•Feb.•2015.17:36:12•GM
Connection:•close
For an audio file the response is:
HTTP/1.1•200•OK
Content-Length:•77628
Content-Type:•audio/mp4
Last-Modified:•Thu, •05•Feb.•2015p•17:38:43•GMT
Accept-Ranges:•bytes
ETag:•"22f26966a41d01:0"
Server:•Microsoft-IIS/7.5
X-Powered-By:•ASP.NET
Date:•Thu, •05•Feb.•2015•17:39:08•GMT
Connection:•close In step 440, it is determined whether the linked file type is supported. In one embodiment, the Supported file type database 142 (which can reside locally on the data enabled device 30, on the system 100 or on the multimedia server 110) is used to make this determination. In one embodiment, if it is determined that the file type is not supported, the actual link to the unsupported multimedia file is displayed in step 442. Another optional test is applied in step 444 to determine if the file is oversized. In some cases the size test is performed to prevent spam and if the file is determined to be oversized for the specified file type and the actual link to the oversized multimedia file is displayed in step 442.

In step 450, in response to determining that the file type is supported and optionally that the file is not oversized, the multimedia file is downloaded as thumbnail for image and if audio media is included playback controls for audio are displayed. In step 460 multimedia file is displayed or played in response to request by the user which is a received user request via a tap on an icon representing the multimedia file in step 462.

Figure 5:
FIG. 5 shows screen shot of a user interface involved in a process file handling of multimedia files described in conjunction with FIGS. 1-4.

Now referring to FIG. 5 user interface screen 500 shows a received text message with attached multimedia files. Screen 500 shows a user interface generated by client application 42 on data enabled device 30. The screen shows thumbnail images (e.g., those displayed in step 450 above). Bubble 510 is displays a link to a multimedia file which is either too large are determined to be spam for a third multimedia file which is not displayed. Optional box 520 is an error message which corresponds to the oversized file. In some embodiment, when a multimedia file is not downloaded automatically, it may still be downloaded manually.

In another embodiment to detect spam, the ETag field (a unique identifier for the file) received in response to a HEAD command is used to detect an attempt to repeatedly send the same file with different URLs (e.g., using link shortness or URL shortening) that point to the same address.

The terms "program," "application" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular data types. Typically the functionality of the program modules may be combined or distributed as desired in various embodiments. Aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

The mobile device(s) or computer systems disclosed herein may include, for example, a personal computer(s), workstation(s), personal digital assistant(s) (PDA(s)), handheld device(s) such as cellular telephone(s), laptop(s), handheld computer(s), or other device(s) capable of interfacing with systems that may operate as provided herein. Accordingly, the devices provided herein are not exhaustive and are provided for illustration and not limitation.

Throughout the entirety of the present disclosure, use of the articles "a" or "an" to modify a noun may be understood to be used for convenience and to include one, or more than one of the modified noun, unless otherwise specifically stated.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method for handling a cloud hosted multimedia file on mobile devices comprising:
   receiving a message with a link to multimedia file;
   extracting the link and determining an address of multimedia server;
   contacting the multimedia server to determine a file type using a HEAD command;
   determining whether the file type is supported; and
   determining that the message is spam by detecting that a file size of the multimedia file as reported in a response to the HEAD command is not within a predetermined range for the file type as reported in the response to the HEAD command.

2. The method of claim 1 further comprising displaying the link in response to determining that the file type is not supported.

3. The method of claim 1 further comprising determining whether the multimedia file is oversized.

4. The method of claim 1 further comprising downloading the multimedia file as a thumbnail in response to determining that the file type is supported.

5. The method of claim 1 further comprising displaying playback controls for an audio multimedia file in response to determining that the file type is supported.

6. The method of claim 1 further comprising:
   receiving a user request via a tap on icon; and
   displaying the multimedia file.

7. The method of claim 1 further comprising determining that the message is spam by detecting that an ETag of the multimedia file as reported in a response to the HEAD command is being used in an attempt to repeatedly send the multimedia file with different URLs.

8. A non-transitory computer readable storage medium for storing thereon computer readable instructions for a method for:
   receiving a message with a link to multimedia file;
   extracting the link and determining an address of multimedia server;
   contacting the multimedia server to determine a file type using a HEAD command;
   determining whether the file type is supported; and
   determining that the message is spam by detecting that a file size of the multimedia file as reported in a response to the HEAD command is not within a predetermined range for the file type as reported in the response to the HEAD command.

9. The non-transitory computer readable storage medium of claim 8, further comprising computer readable instructions for a method for:

displaying the link in response to determining that the file type is not supported.

10. The non-transitory computer readable storage medium of claim 8, further comprising computer readable instructions for a method for:

determining whether the multimedia file is oversized.

11. The non-transitory computer readable storage medium of claim 8, further comprising computer readable instructions for a method for:

downloading the multimedia file as a thumbnail in response to determining that the file type is supported.

12. The non-transitory computer readable storage medium of claim 8, further comprising computer readable instructions for a method for:

displaying playback controls for an audio multimedia file in response to determining that the file type is supported.

13. The non-transitory computer readable storage medium of claim 8, further comprising computer readable instructions for a method for:

receiving a user request via a tap on icon; and displaying the multimedia file.

14. The non-transitory computer readable storage medium of claim 10, further comprising computer readable instructions for a method for:

determining that the message is spam by detecting that an ETag of the multimedia file as reported in a response to the HEAD command is being used in an attempt to repeatedly send the multimedia file with different URLs.

* * * * *